United States Patent

[11] 3,593,326

[72] Inventors Ian Turner
Martins Wood, Stevenage, Hertfordshire;
Peter George Jackaman, Trotts Hill,
Stevenage, Hertfordshire, both of, England
[21] Appl. No. 839,150
[22] Filed July 7, 1969
[45] Patented July 13, 1971
[73] Assignee International Computers Limited
London, England
[32] Priority July 9, 1968
[33] Great Britain
[31] 32714/1968

[54] MAGNETIC HEAD MOUNTING WITH PLURAL GIMBALS
6 Claims, 6 Drawing Figs.

[52] U.S. Cl. .......... 340/174.1 E, 179/100.2 P
[51] Int. Cl. .......... G11b 5/60
[50] Field of Search .......... 340/174.1 E, 174.1 F; 179/100.2 CA, 100.2 C, 100.2 P

[56] References Cited

UNITED STATES PATENTS 3,310,792 3/1967 Groom et al. .......... 340/174.1
3,349,384 10/1967 Kohn .......... 340/174.1
3,430,006 2/1969 Taylor et al. .......... 340/174.1

*Primary Examiner*—Bernard Konick
*Assistant Examiner*—Vincent P. Canney
*Attorney*—Hane & Baxley

ABSTRACT: A gimbal mounting for a magnetic head is disclosed which is constructed of a sheet of resilient material which has apertures therein defining a first gimbal supporting an intermediate area within an outer area of the sheet and further apertures defining a second gimbal supporting an inner area of the sheet within the intermediate area. The outer area is secured to a support member and a magnetic head is secured to the inner area. The intermediate area also carries a pair of skids, or alternatively a pair of further gimballed inner areas to which magnetic heads are secured. The skids and head, or the three heads form, in cooperation with a record surface form, a three-point suspension for the intermediate area. The first gimbal ensures that the three-point suspension is able to follow relatively slow surface changes of the record whilst the second gimbal supporting the inner area permits the head to be closely in contact with the record surface in spite of relatively rapid surface changes.

INVENTORS
IAN TURNER
PETER GEORGE JACKAMAN
BY
Howe and Baxley
ATTORNEYS

MAGNETIC HEAD MOUNTING WITH PLURAL GIMBALS

BACKGROUND OF THE INVENTION

1. Field of the Invention

The present invention relates to arrangements for mounting magnetic transducing heads for use with magnetic recording apparatus.

2. Description of the Prior Art

In magnetic recording apparatus, particularly for use in connection with information storage in association with electronic data processing equipment, it has previously been proposed to use magnetic transducing heads supported in a gimbal mounting adjacent the magnetic recording surface of, for example, a recording disc. The gimbal mounting arrangement previously proposed consisted of a pair of conventional gimbal rings, both pivotally supported at diametrically opposed points. One ring is supported within the other, the supporting area of the individual rings of the pair being respectively at right angles. The magnetic transducing head is supported within the inner ring. The gimbal action of the rings allows, in the conventional manner, the head to move to maintain its operating face parallel to the recording surface. Such an arrangement requires to be accurately manufactured, for to be fully effective it is desirable that the pivots are as friction free as possible. Hence, such an arrangement is expensive to manufacture, and as the size and mass of the magnetic head is reduced, so the problems of manufacture, and the consequent manufacturing cost, are greatly increased.

SUMMARY

According to one aspect of the present invention a magnetic head mounting includes a support member; a sheet of resilient material having apertures therein defining an outer area secured to said support member; an intermediate area; an inner area effective to carry a magnetic head; a first mounting ring between the outer area and the intermediate area; a first set of at least two first bridging elements connecting the outer area to the first mounting ring; a second set of first bridging elements corresponding in number to the first set of first bridging elements connecting the first mounting ring to the intermediate area, the first bridging elements of each set being regularly disposed about the first mounting ring and the first bridging elements of one set lying midway between the first bridging elements of the other set; a second mounting ring between the intermediate area and the inner area; a first set of at least two second bridging elements connecting the intermediate area to the second mounting ring; a second set of second bridging elements corresponding in number to the first set of second bridging elements connecting the second mounting ring to the inner area; the second bridging elements of each set being regularly disposed about the second mounting ring and the second bridging elements of one set lying midway between the second bridging elements of the other set.

DESCRIPTION OF PREFERRED EMBODIMENTS

Figure 1:
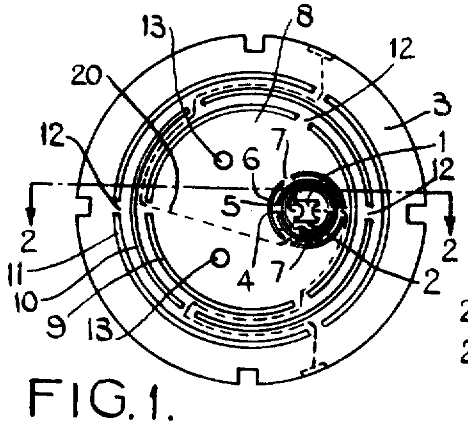
FIG. 1 is a plan view of a magnetic transducing head support.

Referring now to FIG. 1 of the drawing a magnetic transducing head 1 is mounted in an inner area 2 of a circular sheet 3 of flexible material, such as phosphor bronze or beryllium copper. The inner area 2 of the sheet is bounded by apertures in the form of three slots 4. Three further slots 5 concentric with the slots 4 extend around outside the slots 4 to define a first mounting ring connected by a set of bridging elements 7 to the inner area 2, the bridging elements 7 being those portions of the sheets lying between the ends of adjacent slots 4. Similarly further slots 6 define a second mounting ring concentric with the first mounting ring and connect to the first mounting ring by further set of bridging elements 7 between the ends of adjacent slots 5 and connected to an intermediate area 8 of the sheet by another set of bridging elements 7 lying between the ends of slots 6. The bridging elements 7 of each set are spaced symmetrically around the inner area 2, and in the example shown in which each set contains three bridging elements, the elements are spaced at 120° intervals. Also, the bridging elements 7 lying between the ends of slots 5 are positioned to lie midway between the other two sets of bridging elements.

Similarly, the intermediate area 8 is bounded by slots 9 and is connected through sets of bridging elements 12 and mounting rings defined by slots 10, 11 to the outer peripheral area of the sheet 3. The sets of bridging elements 12 are symmetrically positioned and the set of bridging elements 12 lying between the ends of slots 11 lie midway between the bridging elements of the other two sets.

The inner area 2 and its boundary slot group are eccentrically offset with respect to the outer ares 8, and the outer area 8 also carries a pair of synthetic sapphire skids 13.

Figure 2:
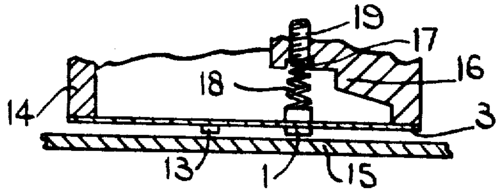
FIG. 2 is a sectional view of the support taken along a line 2–2 of FIG. 1 mounted on a mounting tube.

As best shown in FIG. 2, the sheet 3 of flexible material is secured in use over the end of a generally cylindrical mounting tube 14, and the tube 14 is supported with the sheet 3 substantially parallel to the recording surface of a magnetic storage member 15, such as a magnetic storage disc. The tube 14 is spaced away from the magnetic member 15 to allow the magnetic head 1 to rest lightly on the recording surface, the skids 13 are also resting on the recording surface to stabilize the head 1 in this position. The tube 14 has an internal projection 16 carrying a recess 17 in which is supported one end of a spring 18, the other end of the spring pressing lightly upon that side of the head 1 remote from the recording member 15. A screwed adjusting rod 19 is provided in the recess 17 to adjust the pressure applied by the spring 18 to the head 1.

During the recording or reading of information from the magnetic member 15, this member is moved laterally with respect to the head 1 in the well known manner. During this movement, the bridging elements 7 and mounting rings defined by the slots 4, 5, 6 around the inner area 2 of the sheet 3 allows the head 1 to tilt as is necessary to follow any irregularities of surface imperfections in the member 15, so that the operating face of the head 1 is maintained in substantially complete contact with the recording surface of the member 15. At the same time the skids 13 together with the operating surface of the head 1 form a three-point suspension arrangement for the intermediate area 8 of the sheet 3, and the bridging element 12 and mounting rings defined by the slots 9, 10, 11 around the intermediate area 8 allow the intermediate area 8 to tilt so that the skids 13 and head 1 can follow any major irregularities in the recording surface.

For example, in the case where the recording member 15 is a disc, tilting of the inner area allows the operating face of the head to be maintained squarely in contact with the surface of the disc despite any local surface imperfections in the disc surface while tilting of the intermediate area allows the three point suspension to follow minute buckling of the disc. It will be realized that it is exceedingly difficult to produce a truly flat recording surface on a recording member, and the two gimbal supports formed by the two groups of slots 4, 5, 6 and 9, 10, 11 respectively are arranged to have different response characteristics to allow the head to follow surface imperfections occurring at different rate ranges. In practice, the imperfections experienced in a well-made disc are such that a very light pressure only is required to be applied to the head 1. Typically, this pressure may be of the order of 5 grams. While it is preferred to use a separate spring, such as the spring 18 to apply this working pressure, it will be realized that alternatively the resilience of the sheet 3 may be utilized to obtain the requisite pressure by omitting the spring 18 and position the mounting cylinder 14 at such a distance from the recording surface of the member 15 that the sheet 3 is slightly deformed out of its normal plane.

It will also be clear that rate of response of the inner and intermediate areas is predictable for any particular material and thickness of the sheet 3, and is determined by the relative spacing and dimension of the bridging elements and mounting rings supporting the respective areas. Thus by appropriate choice of these parameters the response characteristic of the areas may be adjusted to suit the characteristics of a particular recording member. In this way the transducing head may be arranged to follow the movement of the recording surface without damaging it due to excessive pressure.

It is usual to provide a transducing head with flying connections, and under some circumstances it has been found that these connecting leads may adversely affect the response characteristic of the head assembly. To overcome this effect it is preferred to incorporate the head connections on the sheet 3 by using conventional printed circuit techniques to deposit conductors on, but insulated from, one surface of the sheet 3, as shown by dotted lines 20 in FIG. 1. The electrical connections to these conductors are then completed outside the boundary of the outer area 8 of the sheet 3.

Figure 3:
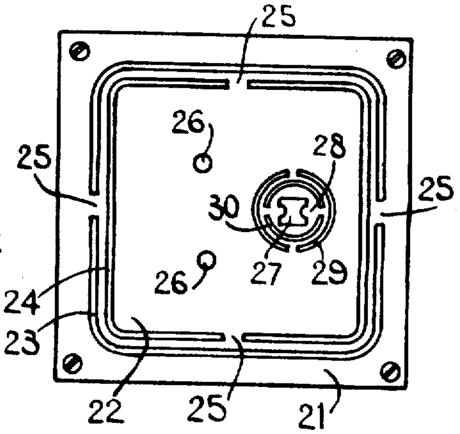
FIG. 3 is a view of a further head support.

The foregoing paragraphs have described a construction in which each gimbal support includes two mounting rings and each set of bridging elements contains three such elements. It is to be understood, however, that different numbers of sets may be formed in the sheet so that the sets of bridging elements may contain other than three elements and that the slots need not define circular boundaries for the areas. For example, FIG. 3 shows an alternative configuration in which a resilient sheet 21 contains a substantially rectilinear intermediate area 22 bounded by two slots 24. The slots 23 and two slots 24 define a mounting ring extending around the area 22 and connected by bridging elements 25 to the area 22 and to the peripheral area of the sheet 21. The two bridging elements 25 between the mounting ring and the area 22 are positioned midway between the two bridging elements 25 between the mounting ring and the peripheral area of the sheet, so that a 90° gimbal action is produced between the intermediate area 22 and the peripheral area of the sheet 21, which is rigidly mounted on a support (not shown). A pair of synthetic sapphire skids 26 are set into the intermediate area 22 with an epoxy resin adhesive, and, together with a recording head 27, the skids 26 form a three point system as previously described. The recording head 27 is contained within an inner area 28 which is bounded by a pair of concentric slots 29, 30. The slots 29, 30, as in the case of the slots 23, 24 together provide a 90° gimbal action for the inner area 28 with respect to the intermediate area 22.

It will be understood from the foregoing description that in order to provide the requisite floating action there are provided separate suspension systems for the inner and outer areas, the head being mounted in the inner area, and that each system is defined by a group of at least two sets of parallel slots around the respective area, the bridging elements between ends of slots of a set being arranged symmetrically about the area boundary, with the elements of any one set of slots lying between the elements of the adjacent sets of slots.

Figure 5:
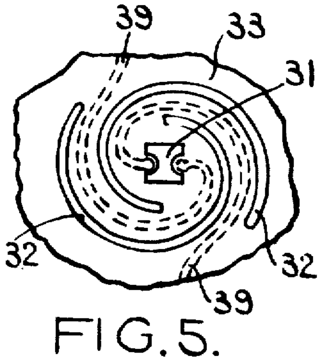
FIG. 5 is a plan view of part of the head support of FIG. 4.
Figure 4:
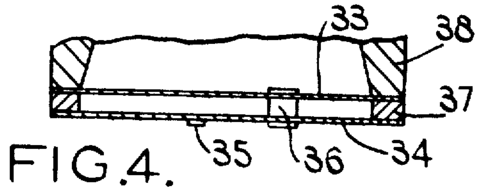
FIG. 4 is a sectional view of another mounted head support.

FIG. 4 and 5 together show an alternative construction for providing the required pressure on the transducing head. FIG. 5 shows a plan view of part of a resilient flat spring member 33 having an aperture 31 around which are formed a pair of spiral slots 32. The slots 32 are interlaid so that the head aperture 31 is virtually isolated from the main body of the member 33. It will be realized that if the main body of the member is moved in a direction perpendicular to its face, then the effect of the spiral slots will be to apply pressure to a head carried in the aperture 31. As shown in FIG. 4 a transducing head 36 is mounted, as previously described, in a resilient sheet 34, which is formed in the same manner as the sheet 3 shown in FIG. 1. The sheet 34 carries synthetic sapphire skids 35 as previously described. The double spiral sheet 33 is secured to the head 36 a short distance behind the sheet 34 by an epoxy resin adhesive, for example. A ring 37 is provided between the sheets 33 and 34 the ring being sufficiently large in internal diameter to clear the slots around the intermediate area of the sheet 34. The ring 37 is slightly smaller in thickness than the space between the sheets 33 and 34 at the head 36. The entire assembly of sheets 33 and 34 together with the ring 37 is then secured to a head support tube 38 so that the sheet 33 is distorted to apply pressure to the head 36. The pressure applied to the head will then obviously depend on the degree of distortion of the sheet 33, which in turn depends upon the difference between the thickness of the ring 37 and the distance between the sheets 33, 34 at the head 36.

It has previously been noted that it is preferred to provide connections to the head 36 by means of printed circuit connections deposited on one face of the resilient sheet, such as the sheet 34. The presence of such printed conductors modifies the characteristics of the sheet 34, and although it is possible to allow for this modification in the design of the sheet such as 34, the printed circuit connections may be provided instead, on the sheet 33 as indicated by broken lined 39 in FIG. 5. In another modification the sheet 34 may be utilized as one conductor and the sheet 33 as the other conductor, the edges of the sheets being mounted so as to be insulated one from the other. In all the foregoing embodiments of the invention, a single head is carried by a resilient sheet and a pair of synthetic sapphire skids together with this head form a three-point support for the assembly on the surface of a recording member. It is to be understood, however, that one or more of the skids may be omitted and a further transducing head substituted. Such a head would be supported within its own inner area within the intermediate area.

Figure 6:
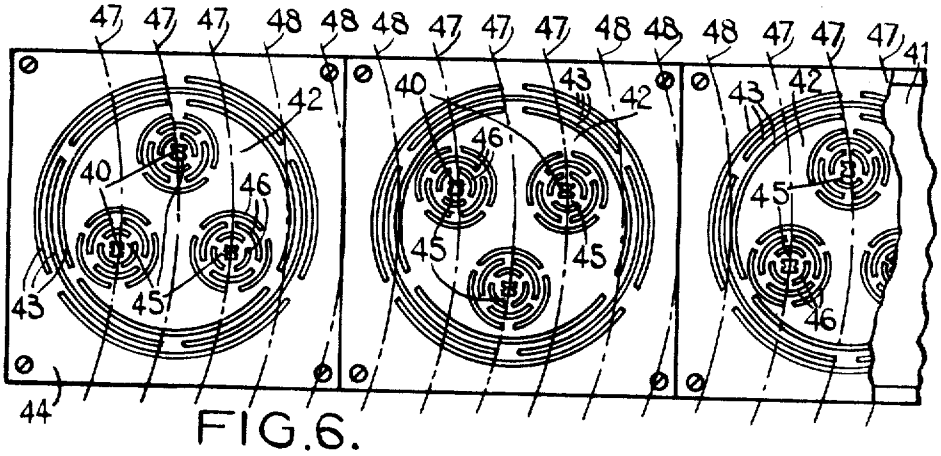
FIG. 6 is a plan view of a supporting arrangement for a number of magnetic transducing heads.

FIG. 6 shows a view of a number of transducing heads 40 supported on an arm 41. Each group of three heads is supported within an intermediate area 42 surrounded by a group of slots 43 in a resilient sheet 44. A separate inner area 45 surrounded by slots 46 provided for each head 40.

The spacings of the heads along the arm 41 are such that, in use in conjunction with a magnetic recording disc (not shown) each group of three heads 40 within the same outer area 42 sweeps out three equally spaced tracks indicated by broken lines 47. As will be seen from FIG. 6 the interval between each group of three tracks 47 is sufficiently wide to accommodate a further three tracks, such as those represented by broken lines 48. Hence it will be apparent that a complete array of equally spaced tracks may be scanned by a pair of arms, such as the arm 41, fitted with an array of heads as shown in FIG. 6. Further, it will also be apparent that a closer track spacing is possible by using additional pairs of arms carrying similar head arrays, the arms being so positioned that their heads scan tracks intermediate these indicated in the figure.

I claim:

1. A magnetic head mounting including a sheet of resilient material on which a first gimbal arrangement is formed around a second gimbal arrangement, said resilient material having apertures therein defining outer, intermediate and inner areas of the material, said intermediate area being within said outer area and said inner area being within said intermediate area, said inner area being effective to carry a magnetic head mounted directly therein, a first portion of said material forming a first mounting ring between said outer and intermediate areas, first bridging portions of said resilient material connecting said first mounting ring to both said outer and intermediate areas, a second portion of said resilient material forming a second mounting ring between said inner and intermediate areas, and second bridging portions of said material connecting said second mounting ring to both said inner and intermediate areas such that said first mounting ring and first bridging portions form said first gimbal arrangement and said second mounting ring and said second bridging portions form said second gimbal arrangement.

2. A mounting as claimed in claim 1 in which said sheet of resilient material has further apertures to define a plurality of inner areas; a like plurality of second mounting rings each extending around a different one of the inner areas respectively and further second bridging portions of said resilient material connecting said second mounting rings to both said inner areas and said intermediate areas to form a plurality of second gimbal arrangements.

3. A mounting as claimed in claim 1 in which the center of said inner area is eccentrically positioned within said intermediate area.

4. A mounting as claimed in claim 1 in which said first gimbal arrangement allows the head to follow slow variations in the surface of the magnetic recording medium and the second gimbal arrangement allows said magnetic head to follow rapid variations in the surface of said magnetic recording medium.

5. A mounting as claimed in claim 1 and further including a magnetic head, a support member secured to the outer area of said resilient material and spring means carried by said support member effective to apply pressure perpendicular to the plane of the resilient material to said magnetic head carried by said inner area.

6. A mounting as claimed in claim 5 in which the spring means includes a further sheet of resilient material having apertures to define an outer portion and an inner portion and a pair of spiral members connecting the inner portion to the outer portion, the outer portion being mounted on said support member.